(12) United States Patent
Kent et al.

(10) Patent No.: US 9,648,864 B1
(45) Date of Patent: May 16, 2017

(54) ELECTRICALLY POWERED INFRARED BASED THERMAL WEED CONTROL SYSTEM

(71) Applicants: Hugh C. Kent, Eustis, FL (US); Michael J. Reischmann, Eustis, FL (US)

(72) Inventors: Hugh C. Kent, Eustis, FL (US); Michael J. Reischmann, Eustis, FL (US)

( * ) Notice: Subject to any disclaimer, the term of this patent is extended or adjusted under 35 U.S.C. 154(b) by 0 days.

(21) Appl. No.: 14/850,077

(22) Filed: Sep. 10, 2015

Related U.S. Application Data

(60) Provisional application No. 62/049,921, filed on Sep. 12, 2014.

(51) Int. Cl.
*A01M 21/04* (2006.01)
(52) U.S. Cl.
CPC ................... *A01M 21/04* (2013.01)
(58) Field of Classification Search
CPC ...... A01M 21/00; A01M 21/02; A01M 21/04; A01M 21/046; A01M 21/043
See application file for complete search history.

(56) References Cited

U.S. PATENT DOCUMENTS

| | | | | | |
|---|---|---|---|---|---|
| 3,627,989 A | * | 12/1971 | Heidler | ................ | H05B 3/0057 219/411 |
| 5,189,832 A | * | 3/1993 | Hoek | .................... | A01M 21/04 126/271.1 |
| 5,793,035 A | * | 8/1998 | Beck | .................... | A01M 7/0089 250/222.1 |
| 5,915,072 A | * | 6/1999 | Campbell | .............. | A61G 11/00 219/411 |
| 6,245,010 B1 | * | 6/2001 | Jones | ..................... | A61G 11/00 600/22 |
| 6,795,568 B1 | * | 9/2004 | Christensen | .......... | A01M 21/04 250/559.29 |
| 7,595,464 B2 | * | 9/2009 | Konishi | .................. | F24C 7/065 219/216 |
| 8,872,136 B1 | * | 10/2014 | Jackson | ................ | A01M 21/00 250/492.1 |
| 2001/0000554 A1 | * | 5/2001 | Prull | ..................... | A01M 21/04 47/1.44 |
| 2010/0024291 A1 | * | 2/2010 | Jensen | .................. | A01M 21/04 47/1.44 |
| 2015/0075066 A1 | * | 3/2015 | Stowe | .................. | A01D 34/015 47/1.3 |
| 2015/0313090 A1 | * | 11/2015 | Weiss | ..................... | A01G 7/045 250/453.11 |
| 2016/0205918 A1 | * | 7/2016 | Chan | ..................... | A01M 21/04 |

* cited by examiner

*Primary Examiner* — Monica Williams
(74) *Attorney, Agent, or Firm* — St. Onge Steward Johnston & Reens LLC

(57) ABSTRACT

An electrically powered infrared based thermal weed control system. A housing has a downwardly facing chamber. At least one electrically powered infrared heating element is mounted within the chamber. A source of electrical potential is electrically coupled to the electrically powered infrared heating element. A control assembly varies the electrical potential to the electrically powered infrared heating elements and the heat generated for controlling undesired weeds there adjacent.

5 Claims, 2 Drawing Sheets

ELECTRICALLY POWERED INFRARED BASED THERMAL WEED CONTROL SYSTEM

RELATED APPLICATION

The present invention is based upon and claims the benefit of Provisional Application Ser. No. 62/049,921 filed Sep. 12, 2014, the subject matter of which is incorporated herein by reference.

BACKGROUND OF THE INVENTION

Field of the Invention

The present invention relates to an electrically powered infrared based thermal weed control system and more particularly pertains to heating weeds to an appropriate temperature and for an appropriate time sufficient to control weeds in a safe, ecological, convenient, and economical manner.

Description of the Prior Art

The use of weed control systems of known designs and configurations is known in the prior art. More specifically, weed control systems of known designs and configurations previously devised and utilized for the purpose of controlling weeds are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe electrically powered infrared based thermal weed control system that allows heating weeds to an appropriate temperature and for an appropriate time sufficient to control weeds in a safe, ecological, convenient, and economical manner.

In this respect, the electrically powered infrared based thermal weed control system according to the present invention substantially departs from the conventional concepts and designs of the prior art, and in doing so provides an apparatus primarily developed for the purpose of heating weeds to an appropriate temperature and for an appropriate time sufficient to control weeds in a safe, ecological, convenient, and economical manner.

Therefore, it can be appreciated that there exists a continuing need for a new and improved electrically powered infrared based thermal weed control system which can be used for heating weeds to an appropriate temperature and for an appropriate time sufficient to control weeds in a safe, ecological, convenient, and economical manner. In this regard, the present invention substantially fulfills this need.

SUMMARY OF THE INVENTION

In view of the foregoing disadvantages inherent in the known types of weed control systems of known designs and configurations now present in the prior art, the present invention provides an improved electrically powered infrared based thermal weed control system. As such, the general purpose of the present invention, which will be described subsequently in greater detail, is to provide a new and improved electrically powered infrared based thermal weed control system and method which has all the advantages of the prior art and none of the disadvantages.

To attain this, from a broad perspective, the present invention is an electrically powered infrared based thermal weed control system having a housing with a downwardly facing chamber, at least one electrically powered infrared heating element mounted within the chamber, a source of electrical potential electrically coupled to the electrically powered infrared heating element, and a control assembly for varying the electrical potential to the electrically powered infrared heating elements and the heat generated for controlling undesired weeds there adjacent.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrically powered infrared based thermal weed control system which has all of the advantages of the prior art weed control systems of known designs and configurations and none of the disadvantages.

It is another object of the present invention to provide a new and improved electrically powered infrared based thermal weed control system which may be easily and efficiently manufactured and marketed.

It is further object of the present invention to provide a new and improved electrically powered infrared based thermal weed control system which is of durable and reliable constructions.

An even further object of the present invention is to provide a new and improved electrically powered infrared based thermal weed control system which is susceptible of a low cost of manufacture with regard to both materials and labor, and which accordingly is then susceptible of low prices of sale to the consuming public, thereby making such electrically powered infrared based thermal weed control system economically available to the buying public.

Lastly, it is still another object of the present invention is to provide an electrically powered infrared based thermal weed control system for heating weeds to an appropriate temperature and for an appropriate time sufficient to control weeds in a safe, ecological, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
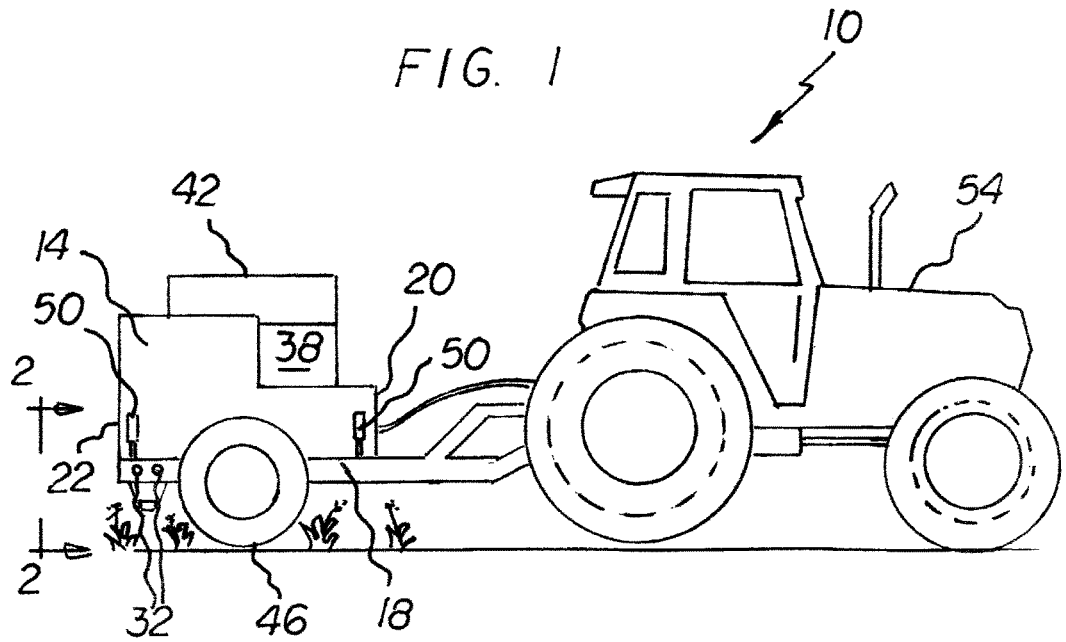
FIG. 1 is a side elevational view of an electrically powered infrared based thermal weed control system constructed in accordance with the principles of the present invention.

With reference now to the drawings, and in particular to FIG. 1 thereof, the preferred embodiment of the new and improved electrically powered infrared based thermal weed control system embodying the principles and concepts of the present invention and generally designated by the reference numeral 10 will be described.

The present invention, the electrically powered infrared based thermal weed control system 10 is comprised of a plurality of components. Such components in their broadest context include a housing, at least one electrically powered infrared heating element, and a source of electrical potential. Such components are individually configured and correlated with respect to each other so as to attain the desired objective.

In the primary embodiment of the invention, first provided is a housing having a downwardly facing chamber.

Next provided is a plurality of spaced electrically powered infrared heating elements mounted within the chamber. In other embodiments, a single element such as a quartz infrared tube may be used.

Next provided is a source of electrical potential electrically coupled to the electrically powered infrared heating element.

Next provided is a control assembly for varying the electrical potential to the electrically powered infrared heating elements and the heat generated for controlling undesired weeds there adjacent.

The primary embodiment further includes a vehicle for moving the housing and electrically powered infrared heating elements across desired crops and undesired weeds for controlling the undesired weeds but not the desired crops.

Figure 2:
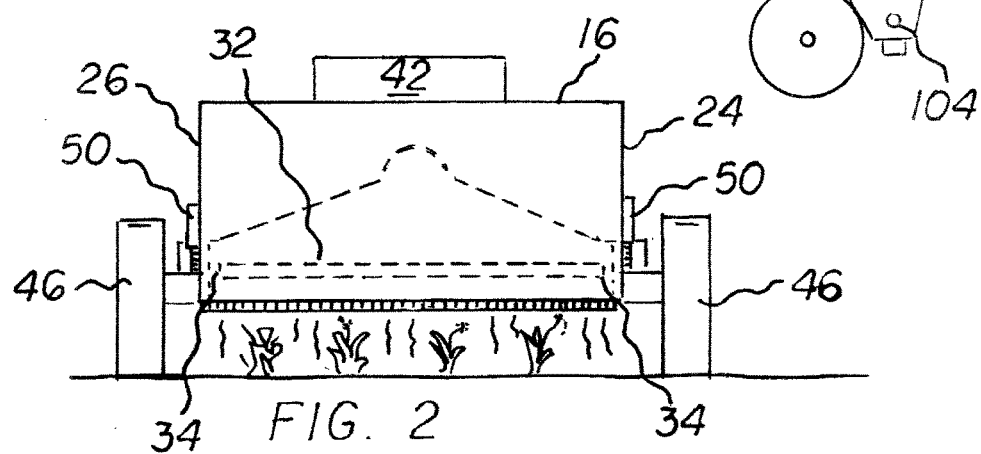
FIG. 2 is a front elevational view of the electrically powered infrared based thermal weed control system taken along line 2-2 of FIG. 1.
Figure 4:
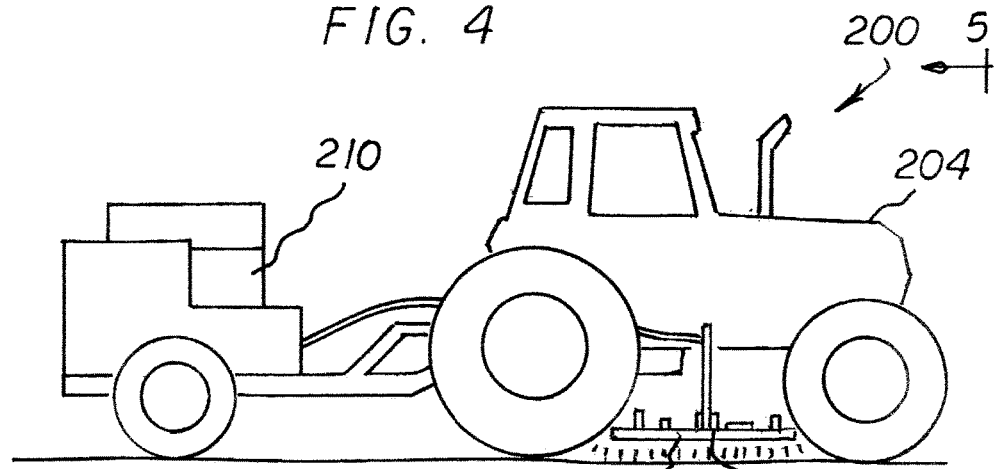
FIG. 4 is a perspective illustration of another alternate embodiment of the invention.
Figure 5:
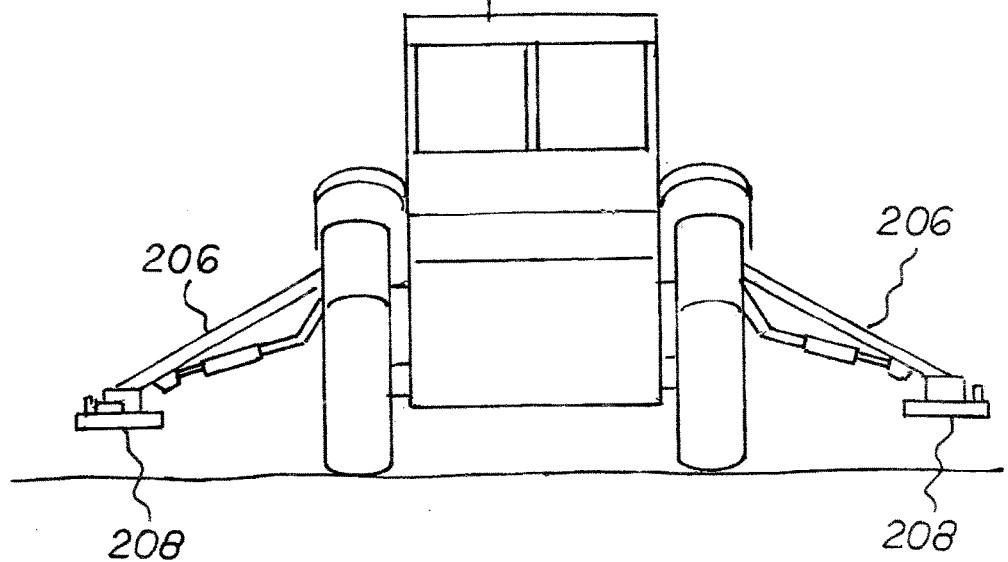
FIG. 5 is a front elevational view of the alternate embodiment of the invention shown in FIG. 4.

Although the primary embodiment of FIGS. 1 and 2 illustrates a single towing vehicle with a single towed housing for the electrically powered infrared heating elements, it should be understood that the invention may include a single towing vehicle with two laterally spaced wings or other configuration suitable for different crops, crop row spacing, and their horticultural variations. In the case of laterally offset wings, each wing would include one or more electrically powered infrared heating elements whereby driving between parallel rows of crops would simultaneously remediate two or more rows of crops. Note FIGS. 4 and 5.

Figure 3:
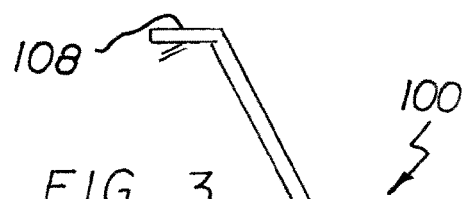
FIG. 3 is side elevational view of an electrically powered infrared based thermal weed control system constructed in accordance with an alternate embodiment of the invention.

An alternate embodiment of the system 100 is illustrated in FIG. 3. In this embodiment a single electrically powered infrared heating element 104 is utilized and handles 108 are provided. The handles are adapted to be gripped by a user to push the electrically powered infrared heating element above desired crops and undesired weeds for controlling the weeds. This embodiment is best suited for use as a weed control device in areas where there are no crops, i.e., a homeowner's driveway or yard. Power in this embodiment is supplied to the system by any of a plurality of means including an extension cord, a battery, a generator, or the like.

In still another embodiment of the invention, the system 200 includes a tractor 204 and two laterally spaced wings 206. The wings are similarly configured. Each wing includes a downwardly facing infrared heating element 208 and a source of potential 210 to power the infrared heating elements. Note FIGS. 4 and 5.

In the preferred embodiment, from a specific perspective, the present invention is an electrically powered infrared based thermal weed control system 10 for heating weeds to an appropriate temperature and for an appropriate time sufficient to control weeds. The heating and the controlling are done in a safe, ecological, convenient, and economical manner.

In this preferred embodiment, illustrated in FIGS. 1 and 2, first provided is a housing 14. The housing is in a rectilinear configuration with a closed top face 16 and an open bottom 18. The housing has a front face 20 and a parallel rear face 22. The housing has a first side face 24 and a parallel second side face 26. A chamber is formed between the closed top face and the open bottom, between the front face and the rear face, and between the first side face and second side face.

Next, a plurality of electrically powered infrared heating elements 32 are provided. The electrically powered infrared heating elements are located within the chamber. The electrically powered infrared heating elements have opposed ends 34 coupled to the first side face and the second side face whereby the electrically powered infrared heating elements extend parallel with the front face and the rear face. As an alternative, quartz infrared tubes may be used in the place of infrared heating elements.

An electrical power source 38 is next provided. The electric power source is attached to the housing. The electrical power source is operatively coupled to the electrically powered infrared heating elements for providing electrical potential to the electrically powered infrared heating elements for generating heat there adjacent. The heat applied to the adjacent object, weed tissue, is at least 100 degrees centigrade.

Next provided is a control assembly 42. The control assembly is under the control of an operator for varying the electrical potential to the electrically powered infrared heating elements so as to vary heat generated for controlling weeds there adjacent.

Although the primary embodiment uses no wheels coupled to the housing, a plurality of wheels 46 may be provided. If provided, the wheels are coupled to and depend downwardly from the housing to facilitate movement of the housing with the electrically powered infrared heating elements. Wheels may be used in combination with other methods of suspending the housing and enabling its movement, such as a tractor's three-point hitch.

Next provided are height adjustment mechanisms 50. The height adjustment mechanisms are used to vary the elevation of the electrically powered infrared heating elements with respect to the weeds to be controlled.

Lastly, a vehicle 54 is provided. The vehicle is operatively coupled to the housing to pull the housing and the electrically powered infrared heating elements across a field of desirable crops and undesirable weeds. The pulling is done at a speed sufficient to deliver enough infrared radiation to rupture cell walls and interrupt photosynthesis in the undesired weeds to thereby control the undesired weeds. The speed is between 1 mile per hour and 10 miles per hour.

The control assembly is adapted to be modified so as to automatically adjust the electrically powered infrared heating elements to the angle and height as a function of the crop base for the particular application.

According to the USDA, organic agriculture is a $35 billion retail market in the United States alone, and it has grown at a double digit rate in each year over the last decade. Worldwide, organic agriculture is practiced on approximately 100 million acres.

The most problematic issue facing organic agriculture is weed control. Weeds compete with crops for water and nutrition, and can profoundly reduce crop yields; to the point where crops lose their economic viability. Herbicides (a sub-set of pesticides that control weeds) are, with few exceptions, synthetically derived, toxic, and strictly prohibited for use in organic agriculture by the USDA. Use of prohibited herbicides will disqualify any user from marketing its produce as organic and will subject the user to forfeit organic certification.

The USDA's organic regulations do, however, allow for the use of thermal methods (CFR 205.206(b) (5)), which includes "Flame, heat, or electrical means" to control weeds and other crop pests.

Historically, thermal weed control has been accomplished through the use of propane fueled "flamers" and propane or diesel fueled "steamers." Early studies on the efficacy of thermal weeding methods recognized that it is not necessary (or desirable) to use combustion to control weeds. Instead, effective control of most weed species can be accomplished by heating the plant tissue to 100 C for 0.10 seconds. Heating plant tissue to this extent is sufficient to rupture cell walls in the target plant and interrupt photosynthesis; with death of the plant following in 2-3 days.

Propane flamers have been available commercially for decades, but are not in widespread use due to severe practical problems that include the following:

1. Safety—The transportation of liquid propane, its conversion from liquid to gas, and its open combustion in an uncontrolled agricultural environment create obvious safety hazards. Risks include burns and explosions (including the explosive potential created when propane torches flame out). Unintended fires are an additional hazard and, because open combustion is an unavoidable feature of this technology, propane flamers cannot be used in areas where burn bans are in effect.

2. Crop Safety—Propane flamers operate at temperatures which can exceed 1,100 C. Significantly, in order to create an environment that will heat target plants to the required 100 C, they need to operate at approximately 800-900 C. The ambient heat created by flamers is difficult to contain and is susceptible to drift created by even small amounts of air movement (whether convection created by the propane heat itself, or light winds). This lack of precision in targeting the necessary heat creates a hazard to the crop plants; especially given the fact that the areas most critical for weed control are invariably those closest to the crops.

3. Fuel Inefficiency—Open combustion of Propane is an expensive and inefficient heat source; especially in an outdoor environment. In addition it creates a significant environmental burden in the form of a high carbon load.

Steam weed control is a more recent technology, but it suffers from its own practical drawbacks:

1. Crop Safety—Although not as profoundly dangerous to crops as propane flamers, steamers suffer from the same difficulties in controlling their heat, limiting their heat to target weeds, and protecting crop plants from collateral damage.

2. Product Cost—Steamers, to the extent they exist as commercial products, tend to be far more complex and expensive than flamers.

3. Ineffectiveness—Most importantly, numerous studies have simply concluded that steamers create insufficient heat to provide effective weed control.

Electrically powered infrared heat may have the potential for wide-spread commercial applications in thermal weed control. The authors perceive its advantages to include:

1. Relative safety for operators,
2. Relative fuel efficiency through the use of diesel generators,
3. Effectiveness and durability,
4. The ability to create intense heat—leading to further efficiencies in application speed,
5. The potential for effective weed control at far lower temperatures (given that plant tissue temperature, rather than ambient heat, is the critical factor determining effectiveness),
6. Targeted heat—reduced risks to crop plants,
7. Usable in a far wider range of weather conditions, and
8. Reduced fire hazards.

The first viable thermal weeding technology will capitalize on worldwide demand for a safe, sustainable method of weed control that (unlike conventional herbicides) is non-toxic, will never lose effectiveness due to weed resistance, and will be acceptable under organic production standards.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, will vary based upon the particular crops and weeds involved, and are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An electrically powered infrared based thermal weed control system comprising:
a housing having a downwardly facing chamber;

at least one electrically powered infrared heating element mounted within the chamber;

a source of electrical potential electrically coupled to the electrically powered infrared heating element;

a control assembly for varying the electrical potential to the electrically powered infrared heating elements and the heat generated for controlling undesired weeds there adjacent;

wherein the electrically powered infrared heating element is a quartz infrared tube; and wherein the at least one electrically powered infrared heating element is a plurality of spaced electrically powered infrared heating elements and further including a vehicle for moving the housing and electrically powered infrared heating elements across desired crops and undesired weeds for controlling the undesired weeds but not the desired crops.

2. The system as set forth in claim 1 and further including:

wherein said vehicle comprises two laterally spaced wings, the wings being similarly configured, each wing including a said downwardly facing chamber comprising infrared heating elements and a source of potential to power the infrared heating elements.

3. The system as set forth in claim 2 and further including:

a plurality of wheels to facilitate movement of the housing with the electrically powered infrared heating elements.

4. An electrically powered infrared based thermal weed control system for heating weeds to an appropriate temperature and for an appropriate time sufficient to control weeds, the heating and the controlling being done in a safe, ecological, convenient, and economical manner, the system comprising, in combination:

a housing having a rectilinear configuration with a closed top face and an open bottom, the housing having a front face and a parallel rear face, the housing having a first side face and a parallel second side face, a chamber formed between the closed top face and the open bottom, and between the front face and the rear face, and between the first side face and second side face;

a plurality of electrically powered infrared heating elements located within the chamber, the electrically powered infrared heating elements having opposed ends coupled to the first side face and the second side face whereby the electrically powered infrared heating elements extend parallel with the front face and the rear face; an electric power source attached to the housing, the electric power source being operatively coupled to the electrically powered infrared heating elements for providing electrical potential to the electrically powered infrared heating elements for generating heat sufficient to heat adjacent weeds to at least 100 degrees centigrade;

a control assembly under the control of an operator for varying the electrical potential to the electrically powered infrared heating elements so as to vary heat generated for controlling the adjacent weeds;

height adjustment mechanisms to vary the elevation of the electrically powered infrared heating elements with respect to the weeds to be controlled; and a vehicle operatively coupled to the housing to pull the housing and the electrically powered infrared heating elements across a field of desirable crops and undesirable weeds, the pulling being done at a speed sufficient to deliver enough infrared radiation to rupture cell walls and interrupt photosynthesis in the undesired weeds to thereby control the undesired weeds while protecting the desirable crop plants from collateral damage, the speed being between 1 mile per hour and 10 miles per hour.

5. The system as set forth in claim 4 and further including:

a plurality of wheels to facilitate movement of the housing with the electrically powered infrared heating elements.

* * * * *